United States Patent
Bargetzi et al.

(10) Patent No.: US 12,332,048 B2
(45) Date of Patent: Jun. 17, 2025

(54) ELECTRONIC TAPE MEASURE

(71) Applicant: SIGVARIS AG, St. Gallen (CH)

(72) Inventors: Andri Bargetzi, Zurich (CH); Daniel Kormann, Kreuzlingen (CH); Serder Tutal, Ofterdingen (DE); Anders Widgren, Taby (SE); Bernhard H Tinz, Reutlingen (DE); Teresa Mandl, Zurich (CH)

(73) Assignee: SIGVARIS AG, St. Gallen (CH)

( * ) Notice: Subject to any disclaimer, the term of this patent is extended or adjusted under 35 U.S.C. 154(b) by 335 days.

(21) Appl. No.: 17/918,555

(22) PCT Filed: Mar. 30, 2021

(86) PCT No.: PCT/EP2021/058375
§ 371 (c)(1),
(2) Date: Oct. 12, 2022

(87) PCT Pub. No.: WO2021/209261
PCT Pub. Date: Oct. 21, 2021

(65) Prior Publication Data
US 2023/0133202 A1    May 4, 2023

(30) Foreign Application Priority Data
Apr. 14, 2020   (CH) .................................... 00442/20

(51) Int. Cl.
*G01B 3/1069*   (2020.01)
*A41H 1/02*     (2006.01)
(Continued)

(52) U.S. Cl.
CPC ............. *G01B 3/1069* (2020.01); *A41H 1/02* (2013.01); *G01B 3/1046* (2020.01);
(Continued)

(58) Field of Classification Search
CPC .. G01B 3/1069; G01B 3/1046; G01B 3/1071; G01B 11/026; G01B 2003/1074; G01B 3/1094; G01B 7/026; A41H 1/02
See application file for complete search history.

(56) References Cited

U.S. PATENT DOCUMENTS 4,551,847 A * 11/1985 Caldwell ................ G01D 5/363
                                                    377/24
4,658,134 A *  4/1987 Okumura ............ G01B 3/1061
                                                    250/230
(Continued)

FOREIGN PATENT DOCUMENTS

DE       60023450 T2    4/2006
DE    202006002947 U1   4/2006
(Continued)

OTHER PUBLICATIONS

Sigvaris AG, International Application No. PCT/EP2021/058375, filed Mar. 30, 2021, International Search Report (and english translation) dated Jun. 9, 2021 and Written Opinion; ISA/EP; 16 pp.

*Primary Examiner* — Yaritza Guadalupe-McCall
(74) *Attorney, Agent, or Firm* — FisherBroyles LLP; Anthony J DoVale

(57) ABSTRACT

An electronic tape measure for measuring a body part includes a housing having a tape outlet opening, a tape drum rotatably mounted in the housing around an axis of rotation, and a tape having length markings attached with an inner end to the tape drum, windable thereon and extendable out of the tape outlet opening. The axis of rotation defines an axial, a radial and an azimuthal direction. Furthermore, the tape measure comprises the following modules: a read-out module adapted to read out the markings; a data processing module connected to the read-out module and adapted to provide a measuring instruction to the user and to process a readout length measurement; an input module connected to (Continued)

the data processing module and adapted to receive input from the user; and a display module connected to the data processing module and adapted to display the measurement instruction and arranged on the housing in a radial-azimuthal plane, wherein the display module comprises a screen.

10 Claims, 4 Drawing Sheets

(51) Int. Cl.
  *G01B 3/1046* (2020.01)
  *G01B 3/1071* (2020.01)
  *G01B 11/02* (2006.01)
(52) U.S. Cl.
  CPC .......... *G01B 3/1071* (2013.01); *G01B 11/026* (2013.01); *G01B 2003/1074* (2013.01)

(56) References Cited

U.S. PATENT DOCUMENTS

| | | | | |
|---|---|---|---|---|
| 4,747,215 A * | 5/1988 | Waikas | G01B 7/026 | 33/763 |
| 4,890,392 A * | 1/1990 | Komura | G01B 11/02 | 377/18 |
| 5,027,526 A * | 7/1991 | Crane | A43D 1/027 | 33/763 |
| 5,142,793 A * | 9/1992 | Crane | G01B 3/1061 | 33/763 |
| 5,286,972 A * | 2/1994 | Falk | G01B 3/11 | 33/763 |
| 5,427,323 A * | 6/1995 | Kaneko | G01B 3/11 | 242/223 |
| 5,433,014 A * | 7/1995 | Falk | G01D 5/347 | 455/67.11 |
| 5,691,923 A * | 11/1997 | Adler | G01B 3/1061 | 702/164 |
| 5,894,678 A * | 4/1999 | Masreliez | G01B 7/026 | 33/762 |
| 6,243,964 B1 * | 6/2001 | Murray | G01B 3/1003 | 33/769 |
| 6,868,620 B2 * | 3/2005 | Sanoner | G01B 3/11 | 33/763 |
| 6,889,444 B2 * | 5/2005 | Trout | G01B 3/12 | 33/780 |
| 7,103,988 B2 * | 9/2006 | Sanoner | G01B 3/11 | 33/763 |
| 7,363,723 B1 * | 4/2008 | Peterson | G01B 3/1084 | 33/760 |
| 7,451,552 B2 * | 11/2008 | Haglof | G01B 3/1041 | 33/767 |
| 7,900,369 B2 * | 3/2011 | Albrecht | G01B 3/1003 | 33/763 |
| 8,732,974 B2 * | 5/2014 | Jayanetti | G01B 3/1061 | 33/760 |
| 10,352,676 B2 * | 7/2019 | Gaines | B65D 51/18 | |
| 11,092,417 B1 * | 8/2021 | Luckey | G01B 3/1003 | |
| 11,779,242 B2 * | 10/2023 | Swanson | A61B 5/1072 | 33/512 |
| 11,859,968 B2 * | 1/2024 | Tecu | G01B 3/1069 | |
| 2004/0040170 A1 * | 3/2004 | Sanoner | G01B 3/11 | 33/762 |
| 2005/0050747 A1 * | 3/2005 | Sanoner | G01B 3/11 | 33/763 |
| 2007/0283590 A1 * | 12/2007 | White | G06Q 10/08 | 33/763 |
| 2008/0072446 A1 * | 3/2008 | Hu | G01B 3/1084 | 33/762 |
| 2009/0307920 A1 * | 12/2009 | Schrage | G01B 3/1041 | 33/760 |
| 2014/0250708 A1 * | 9/2014 | Bauer | G01B 3/1061 | 33/760 |
| 2015/0308807 A1 * | 10/2015 | Rhoden | G01B 3/1061 | 33/763 |
| 2016/0040971 A1 * | 2/2016 | Hoge | H04W 4/80 | 33/760 |
| 2018/0299241 A1 * | 10/2018 | Nikolic | G01B 3/1061 | |
| 2023/0131261 A1 * | 4/2023 | Swanson | A61B 5/4561 | 33/512 |
| 2023/0133202 A1 * | 5/2023 | Bargetzi | G01B 3/1046 | 33/755 |
| 2023/0140462 A1 * | 5/2023 | Reed | G01B 3/1069 | 33/762 |

FOREIGN PATENT DOCUMENTS

DE  102017113117 A1  12/2017
KR  2016111074 A *  9/2016  .......... G01B 3/1061

* cited by examiner

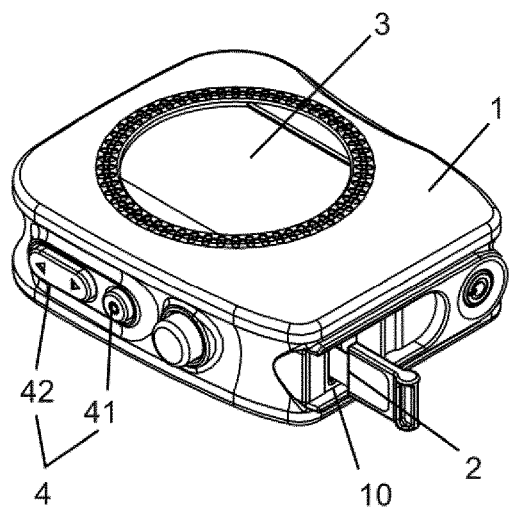
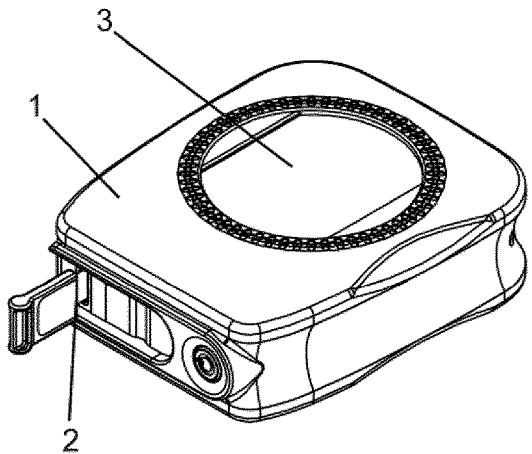
Fig. 1
Fig. 2
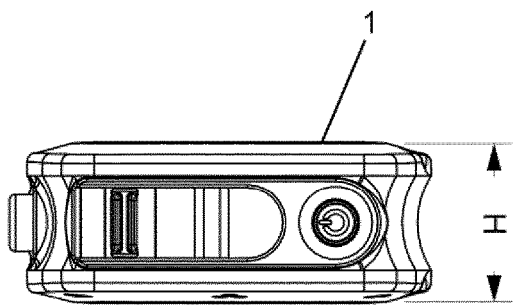
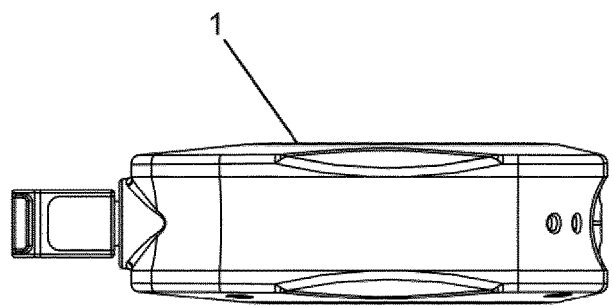
Fig. 3
Fig. 4
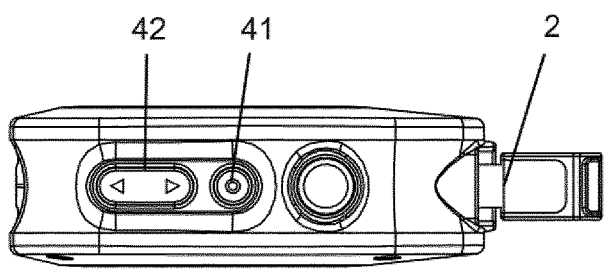
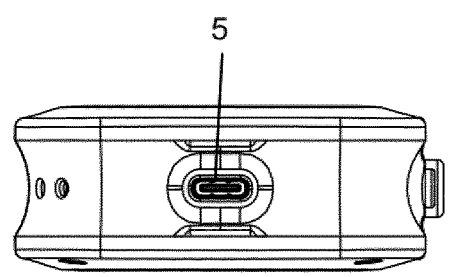
Fig. 5
Fig. 6

ELECTRONIC TAPE MEASURE

FIELD OF THE INVENTION

The invention relates to an electronic measuring tape for measuring a body part and to a method for measuring a body part with an electronic measuring tape.

BACKGROUND

When making or selecting accurately fitting garments such as suits, the challenge is to accurately and reliably record all the required measurements of a person. Depending on the garment, such measurements can be, for example, a circumference of the upper or lower leg, a leg length, an arm length, a chest circumference or a waist circumference.

Traditionally, the required measurements are taken with an analogue measuring tape, noted on a form and a suitable garment is made or a size is determined, e.g. from a predefined size selection. Due to the many manual steps because of the high number of measuring points, such a procedure is time-consuming. Furthermore, the conventional procedure is prone to errors, since, for example, required measurements are forgotten, i.e. not measured, or the procedure is not carried out correctly.

DISCLOSURE OF THE INVENTION

It is therefore an object of the invention to provide a device and a method with which the measurement of a body part can be carried out in a time-saving manner, reliably and as error-free as possible.

A first aspect of the invention therefore relates to an electronic measuring tape for measuring a body part. Typical examples of the body part are a leg, an arm or a torso.

The electronic measuring tape comprises the following elements:
- a housing with a tape outlet opening: the housing may be made of, for example, plastic, melamine, aluminium, metal, carbon. It is further advantageous that the housing comprises non-slip elements, e.g. made of rubber, and/or that a shape and or size of the housing is such that it can be held more easily in one hand.
- a tape drum rotatably mounted in the housing around an axis of rotation, the axis of rotation defining an axial, a radial and an azimuthal direction: Preferably, the tape drum comprises a restoring element, e.g. a spring, which exerts a restoring torque on the tape drum when the tape drum is rotated around the axis of rotation.
- a tape with length markings, which is attached to the tape drum with an inner end, can be wound onto the drum and can be led out of the tape outlet opening: The length markings can in particular be read by a machine. Furthermore, the tape can also comprise conventional measuring lines and dimension numbers for reading by the user.
- a read-out module which is adapted to read out the markings: In particular, the read-out module comprises an optical sensor for reading out the markings, wherein "optical" is not limited to visible light, but also comprises radiation of other frequencies, in particular infrared radiation. Preferably, the read-out module also comprises a radiation source for illuminating the marks on the tape. The radiation source and the optical sensor may be located on the same side of the tape or on opposite sides; in the latter case, the tape is at least partially transparent to the radiation.
- a data processing module connected to the read-out module and adapted to provide a measuring instruction to the user and to process a read-out length measurement, e.g. a length or a circumference: details of the measuring instructions and of the read-out of the measurement will be described in more detail later, in particular in connection with the method.
- an input module connected to the data processing module and adapted to receive an input from the user: the input module may comprise at least one button on the housing for receiving the input. An input from the user can be, for example, the command to now record or read out a measured value.
- A display module connected to the data processing module, adapted to display the measurement instruction and arranged on the housing in a radial-azimuthal plane: The display module comprises a screen. Preferably, the display module comprises a touch-sensitive screen, i.e. a touchscreen, which is adapted to receive the input. In this case, the display module comprises the input module at least partially. An advantage of mounting the display module in a radial-azimuthal plane on the housing is that it can be large, in particular larger than 33 mm×28 mm, and easily readable.

In one embodiment, the read-out module, the data processing module and/or the input module are arranged azimuthally around the tape drum in the housing and enclose it in the azimuthal direction by at least half, in particular by two thirds or three quarters. Usually, the mentioned modules comprise electronic components on circuit boards, which can be arranged in the described arrangement in a space-saving way. This allows the entire measuring tape to be made small and user-friendly so that it fits in one hand in particular.

Preferably, the housing has dimensions in the radial-azimuthal plane of at most 100 mm×100 mm, in particular at most 85 mm×70 mm. Furthermore, it is advantageous that the housing has a height in the axial direction of at most 30 mm. The housing thus enables in particular a one-handed operation of the tape measure.

Preferably, the screen occupies at least 15%, in particular at least 30% or 50%, of at least one side surface of the housing in a radial-azimuthal plane. As described above, the screen may be touch-sensitive. In particular, the screen has dimensions of at least 33 mm×28 mm. Such a large screen improves readability and enables the display of precise measuring instructions, e.g. supported by a graphical representation of how to arrange the measuring tape anywhere on the body part.

In one embodiment, the measuring tape comprises a first fixation element at an outer end of the tape and a second fixation element on the housing. The first fixation element allows temporary fixation to the second fixation element. This is particularly useful for circumference measurements: the tape can be placed around the body part, the first fixation element is temporarily attached to the second fixation element and the tape is automatically retracted, especially at the push of a button, until the tape is in full circumferential contact with the body part. In this way, an accurate circumference measurement can be achieved.

Preferably, the first and second fixation elements each comprise a magnet. In this way, a simple and quick fixation and release is achieved. Alternatively or additionally, the second fixation element can comprise a recess in the housing. The recess improves the operability, especially when releasing the first fixation element. In general, the second fixation element is preferably arranged adjacent to the tape outlet opening. Advantageously, the second fixation element comprises two magnets on opposite sides of the tape outlet opening. This allows the tape to be easily fixed to the housing regardless of the direction in which the tape is guided around the body part.

In one embodiment, the measuring tape additionally comprises a rangefinder connected to the data processing module and adapted to measure the distance to an object. For this purpose, the rangefinder can be, for example, a laser rangefinder, infrared rangefinder or ultrasonic rangefinder. In an advantageous embodiment, the rangefinder comprises an infrared time-of-flight laser component. Such a rangefinder measures the distance to the object, which is in particular the floor, by reflection of laser light, in particular infrared laser light, or ultrasound, e.g. with a "time-of-flight" method. Preferably, the data processing module is adapted to receive and process both a length measurement from the read-out module and a distance measurement from the rangefinder in response to an input from the user. The quasi-simultaneous measurement of the two measured values, e.g. within 1 s, preferably within 0.1 s, enables easier measurement of the body part. For example, a circumference of a leg and a length of the leg, i.e. the distance of the measuring tape from the ground, can be measured in the same step.

A second aspect of the invention relates to a method of measuring a body part using an electronic measuring tape. In particular, the measuring tape may be configured as described above. The method comprises the following steps:

Issuing a measuring instruction to the user: the measuring instruction may be issued in words and/or pictorially. Preferably, the measuring instruction describes or depicts, e.g. graphically, how the user should apply the measuring tape to the body part.

Receiving an input from the user: In the simplest case, the input consists of a touch, e.g. on a touch-sensitive screen, or a press on a button of the measuring tape. In particular, the user can confirm with the input that the measuring tape is now in contact with the body part as shown by the measuring instruction.

The measurement value can be measured by the measuring tape directly at the time of input or with a time delay of e.g. 1 s, in order to obtain a more accurate measurement, since the time delay means that any movement of the measuring tape at the time of input is not included in the measurement. Furthermore, at the same time or within a short time interval of e.g. 1 s, in particular 0.1 s, a distance value to an object can also be received by the rangefinder of the measuring tape. The distance value can be measured in particular to the floor and thus represent e.g. a leg length.

Advantageously, the steps of outputting, receiving and reading-out are repeated with at least a second measuring instruction. In this way, even more complex products, such as tights or a bandage, which affect both the upper and lower leg, can be precisely adapted to the body part. Optionally, each of the measurements can be repeated. For this purpose, a prompt to confirm the measurement value can be displayed to the user during the measurement. In an advantageous embodiment, the user has the option to return to a previous measurement value by selecting the "back" command and to record and replace it again. If, for example, the user had not applied the measuring tape correctly to the body part, he can use it to repeat and correct the measurement.

In one embodiment, the procedure additionally comprises the steps:

Outputting a product query: the display of the product query may comprise, for example, displaying a list of products from which the user can select, e.g. a list of different types of clothes. In particular, the user can then make a selection on the touch screen. This can be done by displaying images or icons of possible items of clothes on the screen.

Receiving a product selection from the user: The product selection includes, for example, selecting the desired product by touching the display at the appropriate location.

Adjusting the measurement instruction depending on the product selection: In particular, depending on the selected product, different measurements are required, e.g. a circumference of the upper and/or lower leg. Due to the automatic adaptation of the measuring instruction, the measuring tape can cover different products and is user-friendly to operate.

Optionally, a derived size value is determined depending on the measured value, which indicates a suitable size for the product selection: The measured value directly represents the measured length, e.g. in cm. Depending on the size value, the user can then determine a suitable series product or have a custom-made product manufactured or produced based on all the measured values. In an advantageous embodiment, the measured value is displayed together with a pictorial representation of the body part where the measured value is taken. Furthermore, it is conceivable that the measuring tape already derives a size value from the measured value or depending on further measured values, which in particular occurs in a predefined size selection. In general, the measuring tape can either display the measured value or the measured values and store them in an internal memory or alternatively display and store the derived value. For example, the last ten measurement sets, i.e. all measurement values for the last ten measured clothes, can always be kept available.

Another aspect of the invention relates to a computer program which comprises instructions which cause an electronic measuring tape, e.g. a measuring tape as described above, to carry out the method steps described above.

BRIEF DESCRIPTION OF THE DRAWINGS

Further embodiments, advantages and applications of the invention will be apparent from the dependent claims and from the following description based on the figures. The figures show FIGS. 1 and 2 are perspective views from above of an electronic measuring tape according to an embodiment of the invention;

FIGS. 3 to 6 lateral views of the measuring tape of FIGS. 1 and 2;

MODES FOR CARRYING OUT THE INVENTION

Figure 7:
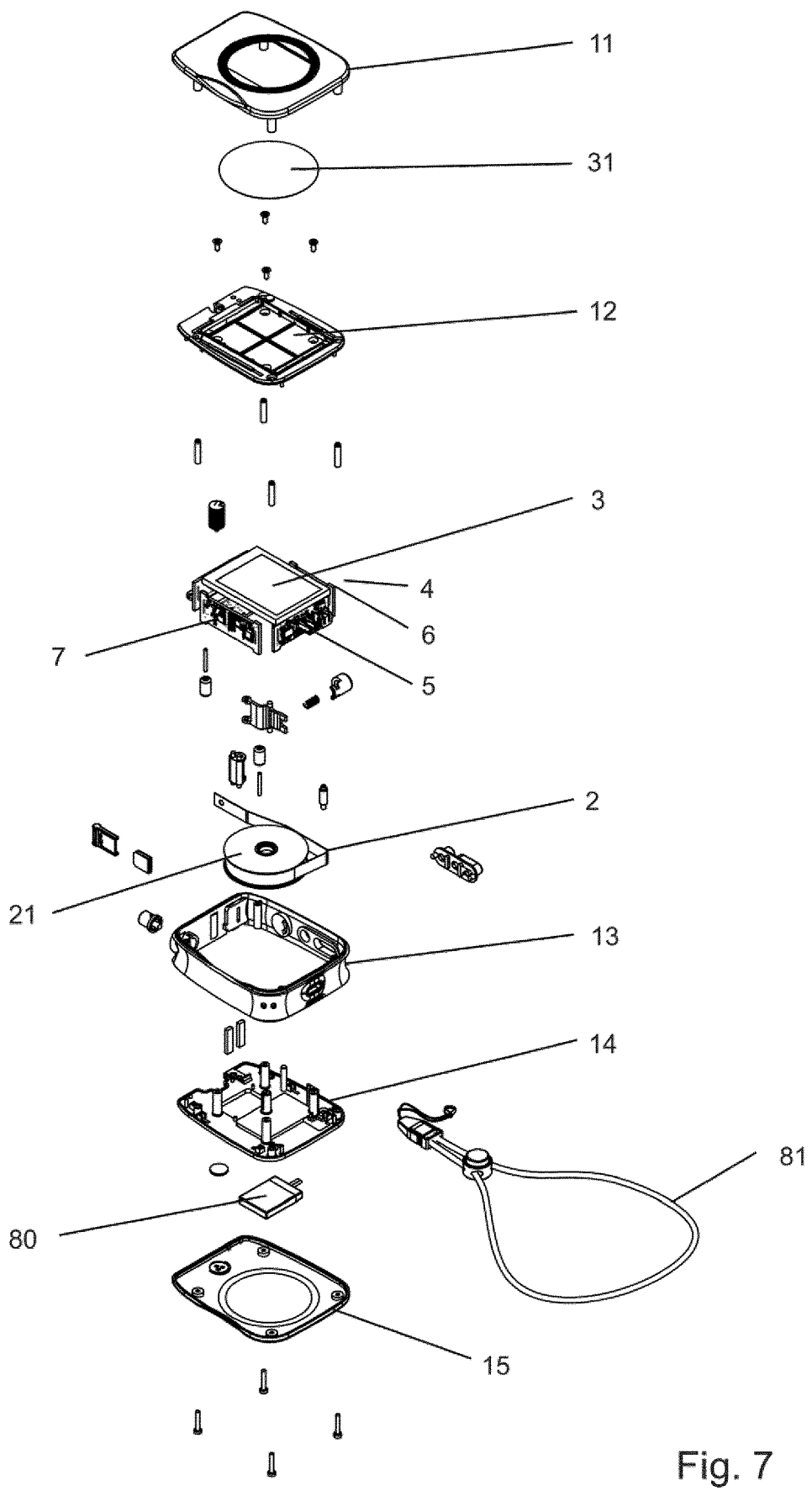
FIG. 7 an exploded view of the measuring tape.

FIGS. 1 to 10 refer to various elements of a preferred embodiment of the electronic measuring tape. In principle, the elements can also be used in other contexts or in other combinations.

Housing and Dimensions

FIGS. 1 and 2 show perspective views of the electronic measuring tape from the outside. A housing 1, forms the outer structure of the measuring tape. For ease of handling, the housing 1 is ergonomically designed and has, in particular, rounded corners and edges. An outer end of a tape 2 projects from a tape outlet opening 10 of the housing 1. The tape 2 can be pulled out through the tape outlet opening 10 and stowed away again in the housing 1. The outer end of the tape 2 is prevented from being pulled completely into the housing 1 by a reinforcement. The reinforcement at the outer end of the tape 2 has further functions with regard to a fixation of the tape 2, which will be described further below.

Furthermore, the measuring tape comprises an image screen 3, for example a touch-sensitive screen, on which, for example, measuring instructions and/or measured values can be output. For the operation of the measuring tape by the user there is a push button 41 and a toggle button 42, which are arranged on a side surface of the housing and are part of the input module 4. Alternatively or additionally, the measuring tape can be controlled by touching the touch-sensitive screen 3. In this case the measuring tape does not necessarily need a push button 41.

Figure 8:
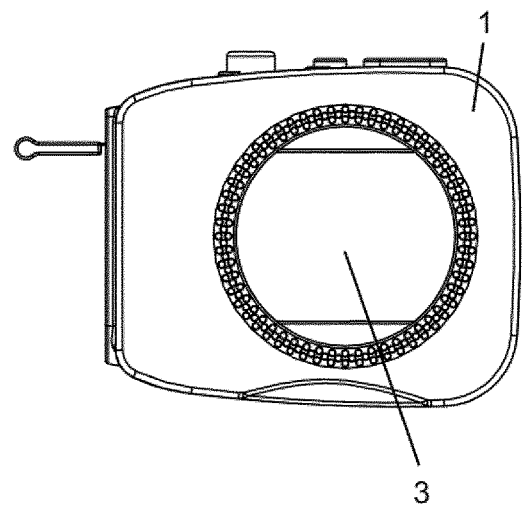
FIGS. 8 and 9 top and bottom views of the measuring tape of the preceding figures.
Figure 9:
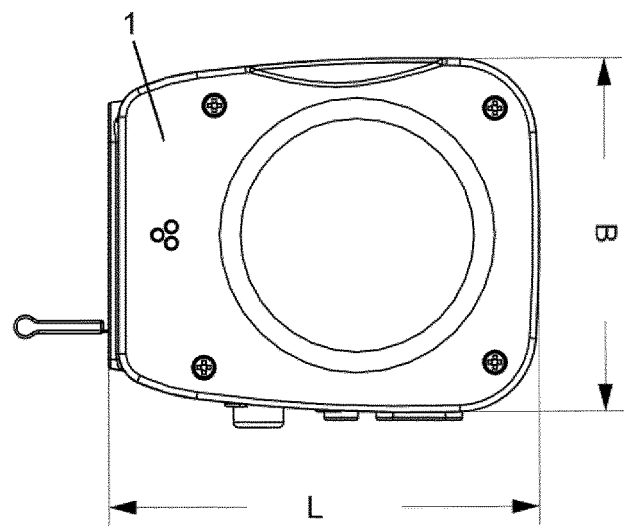

FIGS. 3 to 6 show views of the four side surfaces of the measuring tape, FIGS. 8 and 9 show top views of the measuring tape from above (FIG. 8 with screen 3) and from below (FIG. 9). According to FIG. 6, the measuring tape comprises a socket 5, e.g. a USB connection. In general, the socket 5 can be used to charge a battery 80 of the measuring tape. Alternatively or additionally, a firmware or the measuring instructions of the measuring tape can be updated via the socket 5.

As can be seen from FIGS. 3 and 9, the measuring tape or the housing 1 is characterised by a height H, a length L and a width B. In the special embodiment, H=27.5 mm, L=82.5 mm and W=69 mm. In general, other dimensions are also conceivable, but care should be taken to ensure that the measuring tape can be easily held in one hand. In particular, at least one of the dimensions B or L is smaller than 100 mm and H is smaller than 30 mm.

Interior of the Measuring Tape

Figure 10:
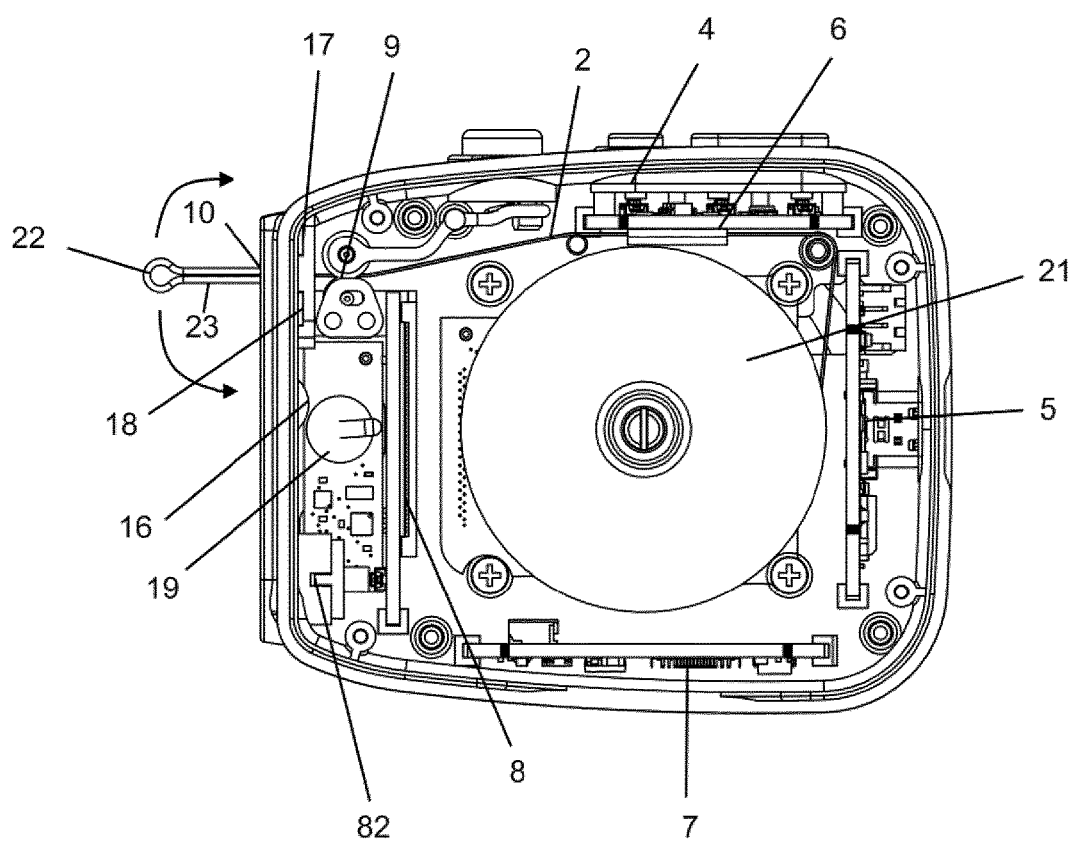
FIG. 10 a top view of the opened measuring tape without cover, mounting plate, display foil and display.

FIGS. 7 and 10 show the interior of the measuring tape in an exploded view and in a top view with the housing open. The upper side of the housing is formed by a housing cover 11, which includes an opening for the display 3. A display foil 31 is fitted under the opening to protect the screen 3 from damage, e.g. of a mechanical nature. In the present example, the opening is approximately round in shape, which enables the screen 3 to be read easily when the measuring tape is held in different ways in one hand.

The housing cover 11, an upper mounting plate 12, a housing frame 13, a lower mounting plate 14 and a housing bottom 15 together form the housing 1 and ensure the mechanical stability of the measuring tape and the protection of the internal elements from external influences, e.g. dust and moisture.

A central element of the measuring tape is the tape 2, which is attached by its inner end to a tape drum 21 and can be rolled up onto it. The tape drum 21 is rotatably mounted in the housing 1, whereby a return element, e.g. a spring, ensures that the tape 2 is largely rolled up on the tape drum 21 without the application of an external force and is thus stowed in the housing 1.

Laterally around the tape drum 21, i.e. at larger radii as seen from the axis of the tape drum 21, various electronic components are mounted, typically on circuit boards as shown: The input module 4, the socket 5, a read-out module 6 and a data processing module 7. The arrangement of these modules around the tape drum 21 is space-saving and in particular allows to build a measuring tape with a low height H, e.g. H<30 mm. Thus it is advantageous that the input module 4, the socket 5, the read-out module 6 and the data processing module 7 surround the tape drum 21 on at least two of the four sides, i.e. generally the tape drum 21 laterally, i.e. in the azimuthal direction, to at least 50%, in particular 75%.

Further elements of the measuring tape are a battery 80, which among other things supplies the screen 3 and the data processing module 7 with power, and possibly a hand strap 81. The hand strap 81 can be attached to the housing 1, e.g. by threading it through a hole in the housing 1. It serves to improve the manageability of the measuring tape and can be designed in different colours for personalisation.

In the top view of the measuring tape in the open state, the circuit boards of the input module 4, socket 5, read-out module 6 and data processing module 7 as well as a further circuit board 8 with an on/off button 82 can be clearly seen, which are arranged azimuthally around the tape drum 21. The read-out module 6 comprises an optical sensor adapted to read length markings on the tape 2. In particular, the markings may comprise machine-readable patterns or codes that can be read, for example, with visible light or with infrared.

Furthermore, FIG. 10 shows a distance meter 19 as described above and a locking mechanism 9 for the tape 2, which allows the tape 2 to be locked in a certain position, i.e. at a certain extended length, so that it is only rolled back onto the tape drum 21 when the locking mechanism is released.

Fixing the Tape

The fixing of the outer end of the tape 2 to the housing 1 is to be distinguished from the locking of the tape 2. Such a fixation is particularly advantageous for circumference measurements, as it facilitates the use of the measuring tape and ensures that the circumference is always measured in the same way.

Such a fixation is shown in FIG. 10. The tape 2 comprises a reinforcement 22 at its outer end, which may be cylindrical, for example. Furthermore, the tape 2 comprises a magnetic material 23 or a magnet there. As a counterpart, at least one magnet 17 is attached to the side of the housing 1 next to the tape outlet opening 10 and, in particular, a further magnet 18 is attached on the other side of the tape outlet opening 10. The magnet 17 and the material 23 can fix the outer end of the tape 2 to the housing 1. With two magnets 17 and 18 it is also possible to fix the tape 2 in both directions (seen from the tape outlet opening 10).

On the one hand, the reinforcement 22 improves the manageability of the tape 2, as it allows the outer end of the tape 2 to be gripped better. On the other hand, the reinforcement 22 makes it easier to loosen a fixation of the tape 2 on the housing 1. In particular, a recess 16 is provided in the housing 1 as a counterpart to the reinforcement 22.

Method for Measuring a Body Part with an Electronic Measuring Tape

Figure 11:
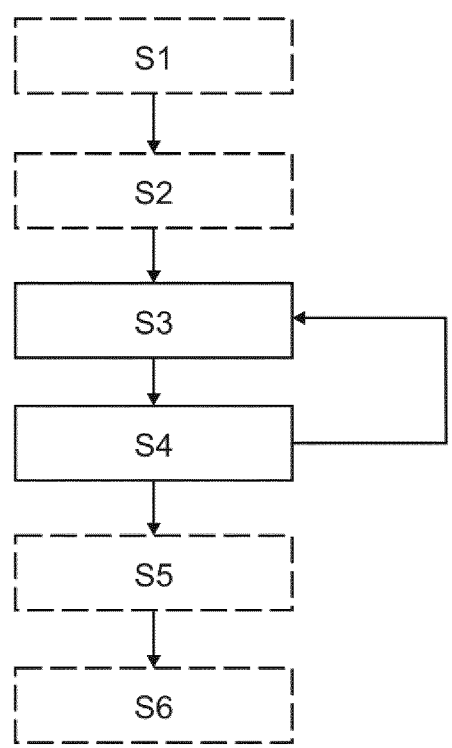
FIG. 11 a flow diagram of a method for measuring a body part with an electronic measuring tape according to an embodiment of the invention.

A method for measuring a body part, which can be carried out, for example, with the electronic measuring tape described above, comprises the following steps, see also FIG. 11. The method can be implemented on a computer unit, e.g. on the data processing module of the measuring tape.

S1: After the measuring tape is switched on, a product query is displayed on the screen of the measuring tape. In particular, different products, product names or product numbers are displayed to the user, e.g. "pantyhose".

S2: A product selection of the user is received, e.g. "tights". The input can be done e.g. by touching the screen once.

Steps S1 and S2 are optional and are sensibly implemented if the measuring tape is to be used for several products.

S3: A measuring instruction for the user is output. In the case of the product "pantyhose", this could be e.g. "Place the measuring tape one hand's width above the knee around the thigh, then please confirm". Ideally, the user then follows this instruction.

S4: Triggered by the user's expected confirmation, e.g. pressing a button or touching the screen, a length measurement is read out. In the example, this is the circumference of the thigh.

If only one measurement is required, e.g. the circumference of the thigh, the measurement can be processed directly in step S5. If more than one measurement is required, e.g. the circumference and the length of the lower leg for a product called "pantyhose", steps S3 and S4 are repeated for these steps until all the measurements required for the selected product have been taken.

S5: This step consists of processing the measurement or measurements. In an advantageous embodiment, step S5 comprises displaying an overview of the entire measurement set, i.e. all the measurement values required for the selected product, in particular together with a pictorial representation of the body part or the product.

S6: Finally, the measurement set is stored in a memory of the measuring tape. For example, the last ten or twenty measurement sets can be stored. This way, the user can still access a specific one of these measurement sets later on. Usually, the user then takes over the at least one measurement value or measurement set and determines a suitable series product from it or orders a corresponding customised product.

While preferred embodiments of the invention are described in the present application, it should be clearly noted that the invention is not limited thereto and may be carried out in other ways within the scope of the following claims.

The invention claimed is:

1. An electronic measuring tape for measuring a body part comprising
    a housing having a tape outlet opening,
    a tape drum rotatably mounted around an axis of rotation in said housing, said axis of rotation defining an axial, a radial and an azimuthal direction,
    a tape with length markings attached with an inner end to the tape drum, windable thereon and extendable out of the tape outlet opening,
    a read-out module arranged to read out the markings,
    a data processing module connected to the read-out module and adapted to provide a measuring instruction to a user and to process a read-out length measurement,
    an input module connected to the data processing module and arranged to receive an input from the user,
    a display module connected to the data processing module and arranged to display the measurement instruction and arranged on the housing in a radial-azimuthal plane, characterized in that
    the housing in the radial-azimuthal plane has dimensions of at most 100 mm×100 mm, and the display module comprises a screen, wherein the screen occupies at least 15% of at least one side surface of the housing in a radial-azimuthal plane, is touch-sensitive, serves as an input module, and shows, supported by a graphical representation, of how to arrange the measuring tape anywhere on the body part.

2. The measuring tape according to claim 1,
    wherein the read-out module, the data processing module and the input module are arranged in the housing azimuthally around the tape drum and enclose it in the azimuthal direction by at least half, in particular by two thirds or three quarters.

3. The measuring tape according to claim 1,
    wherein the housing in the radial-azimuthal plane has dimensions of at most 85 mm×70 mm,
    in particular wherein the housing has a height in the axial direction of at most 30 mm, and
    in particular wherein the housing enables a one-handed operation of the measuring tape.

4. The measuring tape according to claim 1,
    wherein the screen occupies at least 30% or 50%, of at least one side surface of the housing in a radial-azimuthal plane,
    in particular wherein the screen has dimensions of at least 33 mm×28 mm.

5. The measuring tape according to claim 1, additionally comprising
    a first fixing element at an outer end of the tape, and
    a second fixing element on the housing,
    wherein the first fixing element allows temporary attachment to the second fixing element,
    in particular wherein the first and the second fixing element each comprise a magnet, and
    in particular wherein the second fixing element comprises a recess in the housing, and
    in particular wherein the second fixing element is arranged adjacent to the tape outlet opening,
    and in particular wherein the second fixing element comprises two magnets on opposite sides of the tape outlet opening.

6. The measuring tape according to claim 1, additionally comprising
    a rangefinder connected to the data processing module and adapted to measure the distance to an object,
    in particular wherein the rangefinder is a laser rangefinder, infrared rangefinder or ultrasonic rangefinder, and
    in particular wherein the data processing module is arranged to receive and process both a length measurement value from the read-out module and a distance value from the rangefinder in response to an input from the user.

7. Measuring tape according to claim 1, having at least one of the following features:
    the read-out module comprises an optical sensor for reading out the markings, the input module comprises at least one push-button on the housing for receiving the input, the display module comprises a touch-sensitive screen adapted to receive the input.

8. Method for measuring a body part with an electronic measuring tape, in particular according to claim 1, comprising the steps of issuing a measuring instruction to the user, receiving an input from the user, triggered by the input: reading out a length measurement value.

9. Method according to claim 8, further comprising the steps of issuing a product query, receiving a product selection from the user, adjusting the measurement instruction in response to the product selection.

10. The method according to claim 8, wherein the measuring instruction describes or depicts how the user is to apply the measuring tape to the body part, in particular wherein the steps of outputting, receiving and reading out are repeated with at least a second measuring instruction, and in particular wherein the measured value or the measured values are displayed in an overview at the end.

* * * * *